Feb. 15, 1966  R. LITTERAL  3,235,685
AUTOMATIC SWITCH CONTROL DEVICE FOR VEHICLE
ATTITUDE CONTROL MECHANISM
Filed July 1, 1963  3 Sheets-Sheet 1

INVENTOR.
ROY LITTERAL
BY Allan J. Murray
ATTORNEY

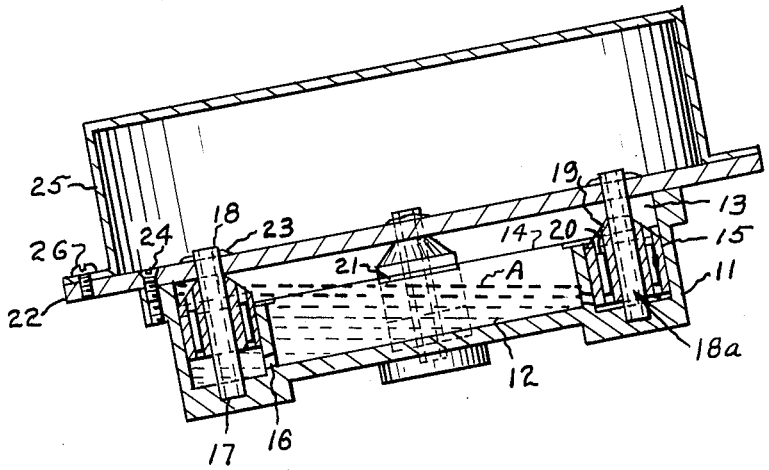

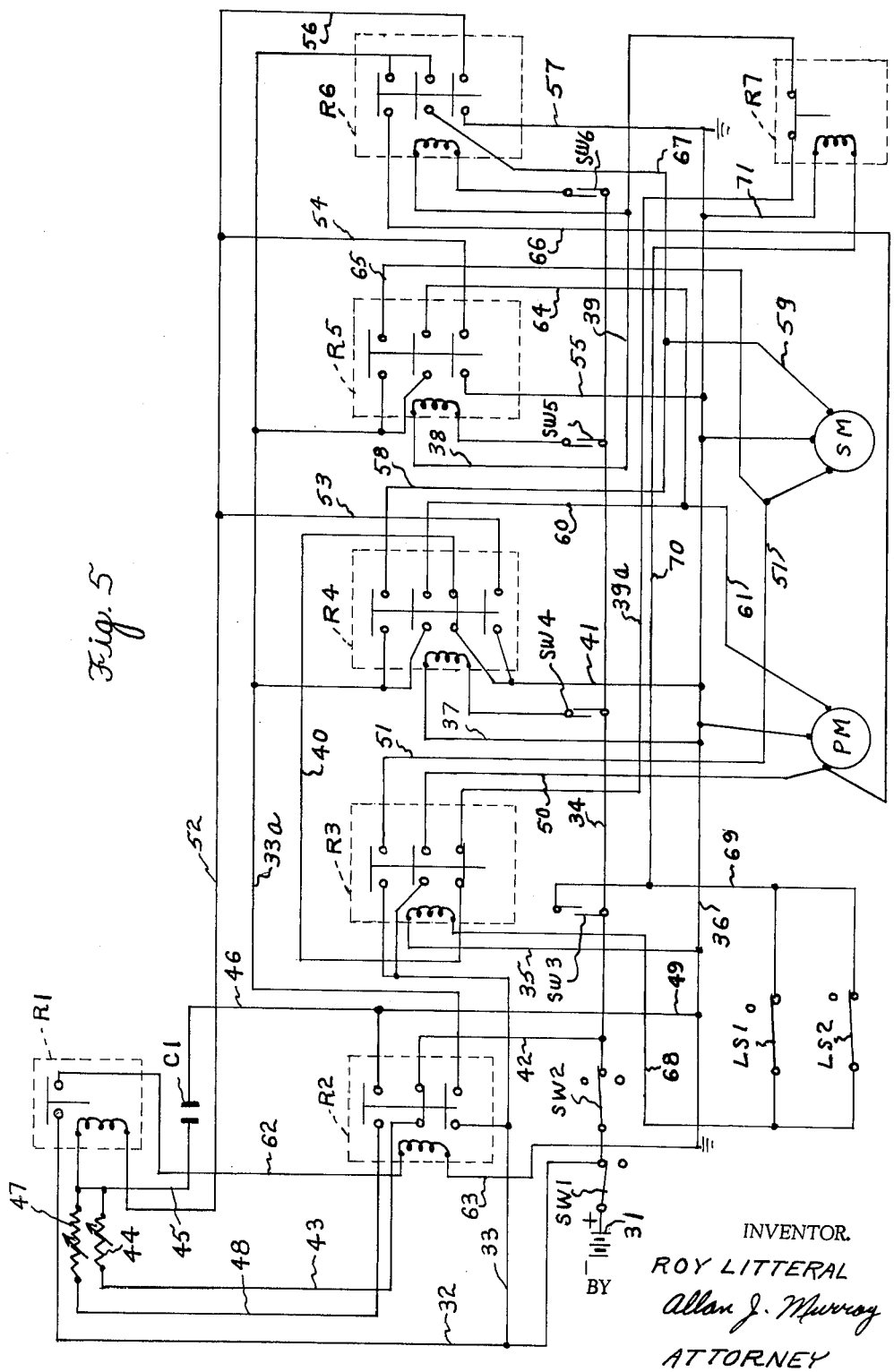

United States Patent Office 3,235,685
Patented Feb. 15, 1966

3,235,685
AUTOMATIC SWITCH CONTROL DEVICE FOR VEHICLE ATTITUDE CONTROL MECHANISM
Roy Litteral, 22448 Beach, St. Claire Shores, Mich.
Filed July 1, 1963, Ser. No. 291,989
14 Claims. (Cl. 200—61.52)

This invention relates to vehicle attitude stabilizing systems having electrically energizable devices for restoring to a desired attitude a vehicle, supported by and moving through a fluid medium, when such vehicle deviates from said desired attitude; and this invention particularly relates to mechanisms sensitive to such deviations and responsive thereto to energize said devices to correct said attitude, and responsive to such corrections to de-energize said devices, and avoid overcorrection.

A known means of correcting the attitude of a boat to a desired attitude is by the installation of a pair of tabs at the stern of such boat as shown in Patent Number 3,062,167, hereinafter described. Said tabs may be moved downwardly or upwardly about an axis, relative to the boat, and act in the water to change the attitude of the boat. Electric motors operating a drive means to the tabs, effect such motion of the tabs when said motors are energized. Heretofore, said motors have been energized manually, or at best, by semi-automatic means.

An object of this invention is to provide fully automatic means, disposable in a desired position in a boat, and responsive to a deviation from a desired attitude of the boat to energize said electric motors to drive said tabs to a position to restore the boat to said desired attitude.

Another object of the invention is to provide in such a system having an electrically energizable device, a mechanism having an interiorly formed sump, with one or more floats disposed in relation to the sump to ascend or descend according to the flow of a liquid contained in said sump and supporting the floats, whereby the floats may energize said devices when said floats descend and de-energize said devices when said floats ascend.

A further object is to provide sockets in said mechanism to respectively receive said floats and communicating with the sump to afford a flow of liquid therebetween responsive to deviations from the desired vehicle attitude, thus affecting a raising or lowering of liquid level in the sockets and a consequent ascent or descent of said floats.

A further object is to provide a first passage means communicating between said sump and said socket to retard flow of liquid from said sockets, and the consequent descent of said floats to energize said devices and to provide a second passage means communicating between said sump and said sockets to increase flow of liquid to said sockets, and consequent ascent of said floats to de-energize said devices promptly when said desired vehicle attitude is restored.

Still another object is to provide electrical switches operable by a magnetic field, and to provide means in said floats to create a field to close said switches when said floats descend and open said switches, when said floats ascend.

A further object is to provide a surface, marginally of said sump to receive a flow of liquid, and to so incline said surface as to facilitate draining of liquid therefrom when said desired attitude is restored.

These and various other objects are attained by the invention hereinafter described and illustrated in the accompanying drawings, wherein:

FIG. 4 is a view similar to FIG. 1 showing the mechanism in a tilted position, with a resultant flow of liquid to the low area thereof, and showing the ascent and descent of floats responsive to said flow.

FIG. 5 is a diagram illustrating electrical controls automatically operating said electrically energizable devices.

Figure 2:
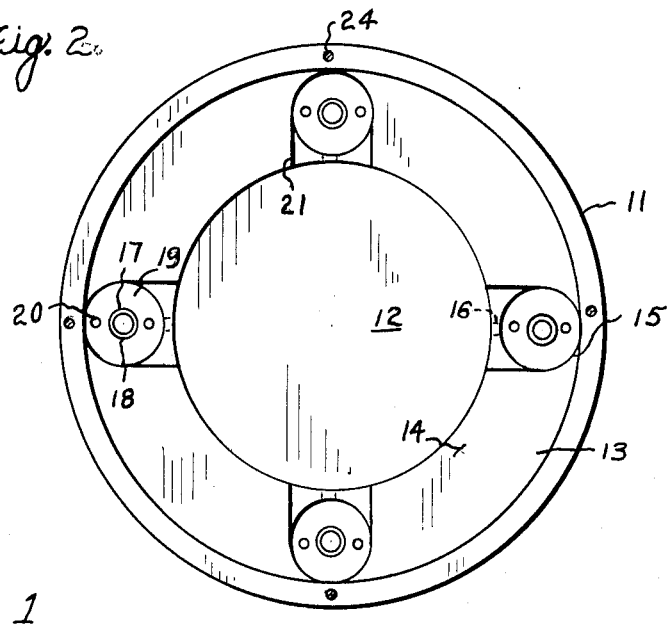
FIG. 2 is a horizontal sectional view on line 4—4 of FIG. 1.

The device hereinafter described may, as an example of its utility, have application to a boat equipped with the device shown in Patent 3,062,167 issued November 6, 1962, to C. H. Bennett. Said patent shows trim tabs 16 hinged at the bottom of the transom 14 at the stern of a boat 10. A mechanism for swinging the tabs up and down on the hinge axes is portrayed in said patent, said mechanism being driven by electric motors 33. Thus, there are two such motors, port and starboard, two sets of mechanism, port and starboard, to operate the respective port and starboard tabs.

Mechanical operation

In the aforesaid views, the reference character 11 designates a base member, interiorly formed with a circular sump 12. Marginally of the opening of the sump, the base member is annularly recessed at 13, leaving an annular surface 14.

A plurality of sockets 15 is formed in the base member to open in the annular surface 14. A first passage means in the form of holes 16 is formed in the wall of the sump 12; such holes respectively communicate between said sump and each of said respective sockets. A predetermined quantity of liquid "A" is received in the sump, and the holes 16 afford a flow of said liquid between the sump and the respective sockets when the construction is tilted from the horizontal position shown in FIG. 1.

The bottom wall of each socket is recessed as at 17, and a tubular member 18 is pressed securely into said recess. The lower portion of each tubular member is received tightly in its respective recess, so that no liquid may seep into the tubular member.

Figure 1:
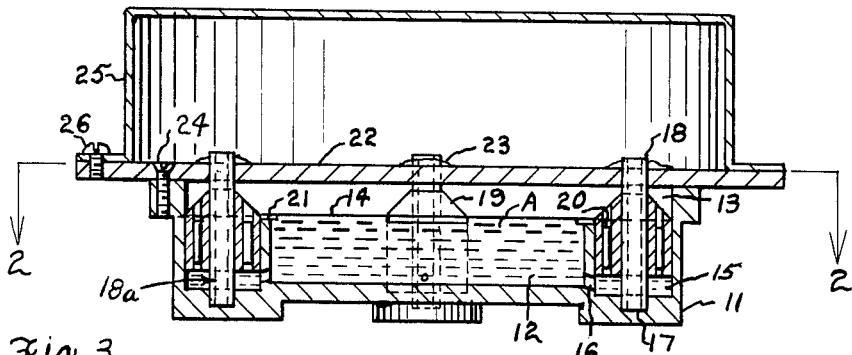
FIG. 1 is a vertical sectional view through the center of the improved mechanism showing the sockets and floats therein.
Figure 3:
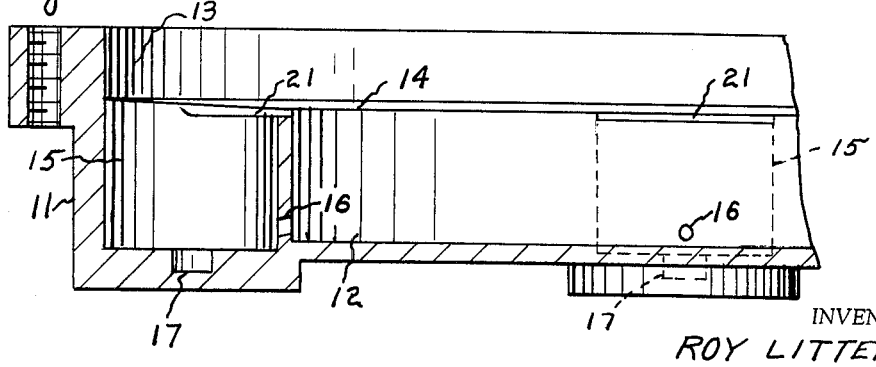
FIG. 3 is a partial, vertical sectional view similar to FIG. 1, but omitting the floats and other interior elements (hereinafter described) to illustrate clearly the sump and sockets.

Each socket respectively receives a respective float 19, which is centrally apertured to freely pass said tubular member therethrough. Each float carries magnets 20. Housed, as at 18a, in each tubular member 18 is a switch (not shown) comprised of spaced normally open contacts, which are closeable, by the presence of a magnetic field. Such switches are so disposed in the tubular members that when the respective floats 19 are in the position as shown in FIG. 1, the field of the respective magnets 20 is sufficiently removed from the respective switches housed in said tubular members, as not to affect said switches. When the base member tilts, however, with the boat in which the device is affixed, a flow of liquid occurs, and as seen in FIG. 4, one or more floats descend, due to a lowering of the liquid level in their sockets. Such descent brings the magnets 20 and their magnetic field into such relationship with the respective switches as to engage the contacts of said switches. Said switches are commercially produced, and commonly known, and hence are not shown.

Engaging the contacts of said switches closes circuits (not shown) affording energization of the electric motors to drive said trim tabs to a position wherein the action of the water thereon will tend to restore the boat to a desired attitude.

When the boat deviates from the desired attitude, such deviations will frequently be corrected by reaction of the boat in the water, and it is not necessary that the leveling mechanism be actuated unless the boat fails to correct its attitude. As the device is secured in and moves with the boat, and tends to operate and actuate the mechanism, it is desirable to incorporate a delaying means to give the boat time to reassume the desired attitude.

As stated above, it is the descent of the floats which causes the switches to close, and, of course, such descent is afforded by flow of liquid from sockets 15. Some liquid will flow over the lip of the socket at the channels 21, and into the sump, but most of said liquid must flow through holes 16 into the sump. By forming said holes of appropriate dimensions, the rate of flow of liquid from the sockets can be predetermined to allow time for the boat to correct its attitude before enough liquid has flowed from the sockets to allow the floats to descend and close the switches.

When the mechanism to correct the boat's attitude has been actuated, and the desired attitude has been resumed, it is then important to stop operation of the mechanism to avert over-correction from one deviant attitude to another. To accomplish this, the sockets must be quickly refillable to raise the floats. By forming the channels 21, at the lips of the sockets, the liquid may flow in more quickly than if such channels were not formed. Said channels have been found to aid substantially in obtaining the most desirable results with the device.

Experience has shown that by applying a slight inward and downward inclination to the surface 14, the liquid flows from said surface more quickly into the sump and thence into said sockets. It has further been found that tapering the upper portion of the floats aids them in shedding liquid from said upper surface enabling them to ascend faster after having been inundated with liquid. Both of these measures contribute to more quickly de-energizing the motors.

A cover plate 22 seals off the sump, and any sealing means, such as a gasket (not shown) may be used to prevent escape of said liquid. Screws 24, or the like, may secure the cover plate in position. The tubular members 18 extend upwardly through holes in said plate 22, which holes are sealed as at 23, to prevent escape of said liquid therethrough. Necessary electrical circuitry (not shown) may be disposed on the cover plate 22, and a housing 25 may be secured to the plate by screws 26 to enclose such circuitry and protect it from moisture.

What I claim is:

1. In a vehicle attitude stabilizing system having an electrically energizable mechanism to restore to a desired attitude a vehicle supported by and moving through a fluid medium, the combination comprising a device for responding to deviations from said attitude to energize said mechanism, such device including a base member formed with a sump, a predetermined quantity of liquid flowable in said sump responsive to said deviations, one or more floats disposed in the base member and supported by said liquid to rise and descend with the flow of said liquid responsive to said deviations, a plurailty of socket means respectively receiving the respective floats, and guiding said floats in their rise and descent, switch means respectively disposed within said sockets, and operable by said respective floats in their descent to energize such mechanism to restore said vehicle to said desired attitude, causing a liquid flow to effect an ascent of the floats to de-energize such mechanism, a plurality of first passage means respectively communicating between said sump and said respective sockets to carry a flow of liquid therebetween and for controlling said flow of liquid from said sockets and delaying the consequent descent of any float affected thereby, a plurality of second passage means respectively communicating between the sump and said respective sockets for carrying a flow of liquid therebetween and for increasing said flow of liquid to cause the ascent of any float to de-energize said mechanism and avert over-correction of vehicle attitude.

2. The combination as set forth in claim 1, said base member being formed marginally of said sump with a recess, said recess having a shelf-like surface which receives the flow of liquid, such surface being inwardly and downwardly inclined to facilitate draining of liquid therefrom to more quickly raise the level of liquid in said sockets to restore said floats to said normal position therein.

3. The combination as set forth in claim 2, means so confining said switches as to prevent access thereto of said liquid.

4. The combination as set forth in claim 3, said sockets having openings in said inclined surface of said recess to readily receive a flow of liquid, and said floats having their upper portions tapered to facilitate draining of liquid therefrom to facilitate their ascent responsive to raising of liquid level in said sockets.

5. The combination as set forth in claim 4, each said float being formed with a hole extending therethrough, said means confining said switches being a tubular member having its bottom end engaged with the bottom wall of each socket in liquid sealed association, said tubular member being freely received in said hole and each said switch being received in a tubular member and predeterminedly positioned therein to be closed by the descent of a float.

6. The combination as set forth in claim 5, said first passage means being apertures respectively extending between the sump and the respective sockets, and determining by their sizes the period of time delay between the occurrence of deviations and the energization of said mechanism.

7. The combination as set forth in claim 6, said second passage means being a channel formed in said inclined surface between said sump and each of said sockets to afford a more copious flow of liquid to and from said socket opening than would otherwise be obtained.

8. The combination as set forth in claim 7, a closure secured to said base member to seal off the opening of said sump to resist the escape of said liquid.

9. The combination as set forth in claim 8, said switch means being operable responsive to the presence of a magnetic field, and magnets carried by said floats to operate said switches when said floats descend.

10. The combination as set forth in claim 2, said socket having openings in said inclined surface of said recess to readily receive a flow of liquid, and said floats having their upper portions tapered to facilitate draining of liquid therefrom to facilitate their ascent responsive to raising liquid level in said sockets.

11. The combination as set forth in claim 10, said first passage means being apertures respectively extending between the sump and the respective sockets and determining by their dimensions the period of time delay between the occurrence of deviations and energization of said mechanism.

12. The combination as set forth in claim 10, said second passage means being a channel formed in said inclined surface between said sump and each of said sockets to afford a more copious flow of liquid to and from said socket opening than would otherwise be obtained.

13. The combination as set forth in claim 12, a closure secured to said base member to seal off the opening of said sump to resist the escape of said liquids.

14. The combination as set forth in claim 13, said switch means being operable responsive to the presence of a magnetic field, and magnets carried by said floats to operate said switches when said floats descend.

References Cited by the Examiner

UNITED STATES PATENTS

| | | | |
|---|---|---|---|
| 2,066,150 | 12/1936 | Hort | 114—125 |
| 2,433,968 | 1/1948 | Wiseley | 200—84 X |
| 2,619,623 | 11/1952 | Meredith | 318—489 |
| 2,906,230 | 9/1959 | Salomon | 114—125 |
| 2,923,874 | 2/1960 | Bell | 318—489 |
| 2,927,176 | 3/1960 | Auld et al. | 200—84 X |

BERNARD A. GILHEANY, *Primary Examiner.*

F. S. MIDDLETON, ROBERT K. SCHAEFER,
*Examiners.*